(12) United States Patent
Kim et al.

(10) Patent No.: US 10,594,993 B2
(45) Date of Patent: Mar. 17, 2020

(54) IMAGE PROJECTIONS

(71) Applicant: Hewlett-Packard Development Company, L.P., Houston, TX (US)

(72) Inventors: Louis Ju-man Kim, San Diego, CA (US); David Bradley Short, San Diego, CA (US); Dimitre Mehandjiysky, Houston, TX (US); Michael Delpier, Houston, TX (US); Dustin Hoffman, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/759,130

(22) PCT Filed: Sep. 23, 2015

(86) PCT No.: PCT/US2015/051579
§ 371 (c)(1),
(2) Date: Mar. 9, 2018

(87) PCT Pub. No.: WO2017/052521
PCT Pub. Date: Mar. 30, 2017

(65) Prior Publication Data
US 2018/0262730 A1  Sep. 13, 2018

(51) Int. Cl.
*H04N 9/31* (2006.01)
*G06F 3/14* (2006.01)
*G09G 3/00* (2006.01)

(52) U.S. Cl.
CPC ............ *H04N 9/3194* (2013.01); *G06F 3/14* (2013.01); *G09G 3/002* (2013.01);
(Continued)

(58) Field of Classification Search
CPC ... H04N 21/4131; H04N 9/3185; G09G 3/002
See application file for complete search history.

(56) References Cited

U.S. PATENT DOCUMENTS 7,364,300 B2 * 4/2008 Favalora ............ H04N 13/0488
345/6
8,638,446 B2 * 1/2014 Briggs ................. G01C 15/002
33/503

(Continued)

FOREIGN PATENT DOCUMENTS

| KR | 10-2013-0050672 A | 5/2013 |
| KR | 10-2013-0138143 A | 12/2013 |
| KR | 10-2013-0040671 A | 4/2016 |

OTHER PUBLICATIONS

Xia et al.,"A 360-degree Floating 3D Display Based on Light Field Regeneration", Optics Express, May 2013, 11 pages.

*Primary Examiner* — Paulos M Natnael
(74) *Attorney, Agent, or Firm* — HP Inc. Patent Department

(57) ABSTRACT

An example system, including a camera to identify a projection area based on at least one criteria, and a projector unit attachable to the camera and to project an image to the projection area. A computing unit provides the image to the projector unit and sets the projector unit to project on the projection area, and the computing unit receives input through the camera and updates the image based on the input.

20 Claims, 4 Drawing Sheets

(52) U.S. Cl.
CPC ......... *H04N 9/3147* (2013.01); *H04N 9/3185* (2013.01); *G09G 2340/0464* (2013.01)

(56) References Cited

U.S. PATENT DOCUMENTS

| | | | |
|---|---|---|---|
| 8,840,250 B1 | 9/2014 | Yao et al. | |
| 8,905,551 B1 | 12/2014 | Worley, III | |
| 9,000,896 B1* | 4/2015 | Kim | H04L 47/41 340/10.5 |
| 9,020,825 B1* | 4/2015 | Garber | G06F 3/167 704/231 |
| 9,437,060 B2* | 9/2016 | Jackson | G07C 9/00103 |
| 9,870,716 B1* | 1/2018 | Rao | G09B 19/0092 |
| 2003/0002016 A1* | 1/2003 | Sellen | H04N 9/3141 353/31 |
| 2004/0090524 A1* | 5/2004 | Belliveau | H05B 37/0254 348/102 |
| 2004/0178750 A1* | 9/2004 | Belliveau | H05B 37/029 315/294 |
| 2008/0095468 A1* | 4/2008 | Klemmer | H04N 9/3147 382/285 |
| 2009/0132926 A1* | 5/2009 | Bucha | G06F 3/16 715/730 |
| 2010/0182136 A1 | 7/2010 | Pryor | |
| 2010/0188428 A1* | 7/2010 | Shin | G06F 1/1639 345/661 |
| 2011/0019108 A1* | 1/2011 | Nelson | H04N 9/31 348/745 |
| 2011/0058109 A1* | 3/2011 | Nishigaki | G06F 3/0425 348/744 |
| 2011/0154233 A1 | 6/2011 | Lamarca | |
| 2012/0316676 A1* | 12/2012 | Fouillade | B25J 11/0005 700/246 |
| 2013/0162688 A1* | 6/2013 | Matsuoka | H04N 9/3188 345/682 |
| 2013/0278725 A1* | 10/2013 | Mannan | G06F 17/5086 348/46 |
| 2015/0324005 A1* | 11/2015 | Kobayashi | H04N 9/3179 345/173 |
| 2015/0374452 A1* | 12/2015 | Saito | A61B 90/36 600/424 |
| 2017/0171521 A1* | 6/2017 | Jung | H04N 9/3194 |
| 2018/0262730 A1* | 9/2018 | Kim | G06F 3/14 |

* cited by examiner

IMAGE PROJECTIONS

BACKGROUND

Computer systems typically employ a display or multiple displays which are mounted on a support stand and/or are incorporated into some other component of the computer system. However, these computer systems have limited display space due to the set size and placement of the display.

BRIEF DESCRIPTION OF THE DRAWINGS

For a detailed description of various examples, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct electrical or mechanical connection, through an indirect electrical or mechanical connection via other devices and connections, through an optical electrical connection, or through a wireless electrical connection. As used herein the term "approximately" means plus or minus 10%. In addition, as used herein, the phrase "user input device" refers to any suitable device for providing an input, by a user, into an electrical system such as, for example, a mouse, keyboard, a hand (or any finger thereof), a stylus, a pointing device, etc.

DETAILED DESCRIPTION

The following discussion is directed to various examples of the disclosure. Although one or more of these examples may be preferred, the examples disclosed should not be interpreted, or otherwise used, as limiting the scope of the disclosure, including the claims. In addition, one skilled in the art will understand that the following description has broad application, and the discussion of any example is meant only to be descriptive of that example, and not intended to intimate that the scope of the disclosure, including the claims, is limited to that example.

Figure 1:
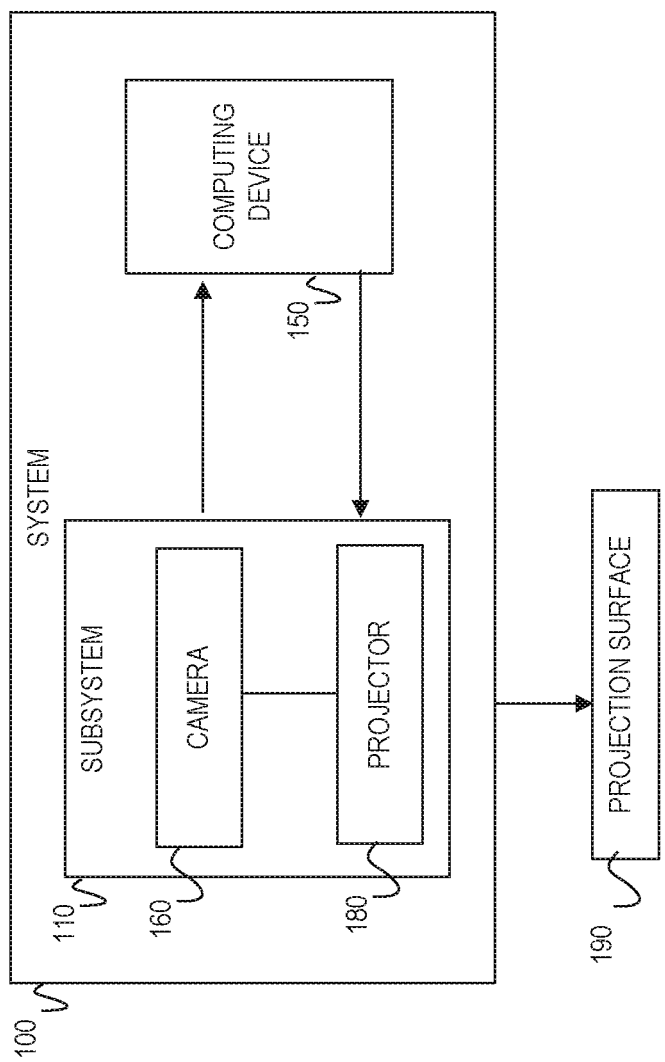
FIG. 1 is a block diagram of an example system in accordance with the principles disclosed herein.

Referring now to FIG. 1, a system 100 in accordance with the principles disclosed herein is shown. In this example, system 100 generally comprises a subsystem 110, which comprises a camera 160 and a projector unit 180, and are communicatively connected to a computing device 150. Computing device 150 may comprise any suitable computing device while still complying with the principles disclosed herein. For example, in some implementations, device 150 may comprise an electronic display, a smartphone, a tablet, a phablet, an all-in-one computer (i.e., a display that also houses the computer's board), a smart watch or some combination thereof.

The projector unit 180 may comprise any suitable digital light projector assembly for receiving data from the computing device 150 and projecting an image or images that correspond with that input data. For example, in some implementations, the projector unit 180 comprises a digital light processing (DLP) projector or a liquid crystal on silicon (LCoS) projector which are advantageously compact and power efficient projection engines capable of multiple display resolutions and sizes, such as, for example, standard XGA (1024×768) resolution 4:3 aspect ratio or standard WXGA (1280×800) resolution 16:10 aspect ratio. The projector unit 180 is further connected to the computing device 150 in order to receive data therefrom for producing light and images. The projector unit 180 may be connected to the computing device 150 through any suitable type of connection while still complying with the principles disclosed herein. For example, in some implementations, the projector unit 180 is electrically coupled to the computing device 150 through an electric conductor, WI-FI, BLUETOOTH®, an optical connection, an ultrasonic connection, or some combination thereof.

During operation of system 100, the projector unit 180 projects an image onto a projection surface 190. The projection surface 190 may comprise any suitable surface in an environment and may not be limited in size and shape. More specifically, the projection surface may be a wall in a bedroom, a counter in a kitchen, a table in a conference room, a desk in an office and/or alike. In one implementation, the projection surface 190 may be selected based on a set of criteria. Such criteria may include size, texture, presence of obstacles, and alike. In some implementations, the selection of a surface may be declined if the criteria is not met. For example, the camera 160 may be searching for a flat surface, and/or an open area with no obstacles, and/or an area with a specific set of dimensions and/or alike. The search continues unless an area that meet the required criteria is identified. In other implementations, various alignment and calibration (e.g. keystone correction) may be applied to modify the projection surface to meet the criteria required for the qualification of the projection surface. For example, if obstacles (e.g., objects, shadow) are detected within the projection surface, various methods consistent with the manner described herein may be applied to qualify the area as a suitable projection surface in view of the criteria. If the surface is found to be uneven or otherwise unsuitable, various methods of alignment and calibration (e.g. keystone correction) may be applied. In another implementation, the background of the identified projection surface may be optionally, digitally removed within the resulting image projected onto the surface.

As described in more detail above, during operation of system 100, the camera 160 scans the surrounding of the system 100 and identifies a suitable projection area (e.g., the projection surface 190) for the projector unit 180 to project data received from the computing device 150. In one implementation, the data being projected may comprise web pages (e.g., weather, email, and social media), applications (e.g., music player, instant messenger, photo/video application, and home system control panel), images or user interface of the computing device 150. Further, in other examples, the data may be dynamic. More specifically, the data may provide augmentation in semantic context with environmental elements (e.g., live direct or indirect view of a physical, real-world environment whose elements are supplemented by computer-generated sensory input such as sound, video, graphics or GPS data). In one example, the projection surface may be the kitchen wall, and the data projected may be related to a recipe. In such example, the projection unit may project data related to ingredients of a recipe (e.g., 1 cup of milk, 2 eggs) onto the projection surface (e.g., wall or counter in a kitchen) that contains the physical objects or pictures of the ingredients (e.g., milk, eggs). The text "1 cup" may be projected next to the milk carton on the kitchen counter, and/or the text "2 eggs" may be projected next to the picture eggs on the kitchen wall.

In one implementation, the camera 160 may communicate the identification of the projection surface 190 to the computing device 150 to instruct the projection unit 180 to project in the identified area. In another implementation, the camera 160 may communicate the identification of the projection surface directly to the projection unit 180, which as a result, projects the data received from the computing unit 150 onto the identified area. In another implementation, the computing device 150 may choose to communicate the selection of the projection surface 190 to a user and request input (e.g., confirmation) from the user before proceeding with the projection of any data. If the user chooses to reject the selected area, the camera may rescan the surrounding of the system 100 to identify another projection surface based on the same or different criteria. In these examples, the user may communicate with the computing device 150 via gesture and/or voice commands. To support this, the camera 160 in the system 100 may be utilized. Moreover, the system 100 may comprise a microphone or similar device that is arranged to receive sound inputs (e.g., voice) from the user during operation.

Figure 2:
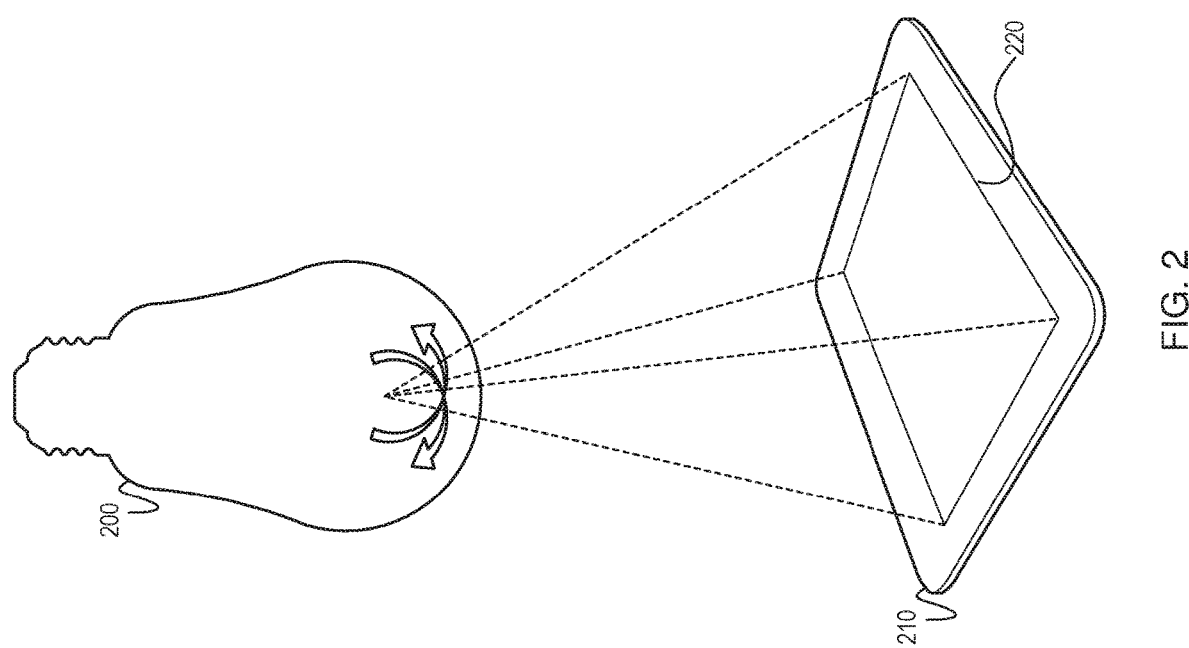
FIG. 2 is a schematic view of the system of FIG. 1 in accordance with the principles disclosed herein.

Referring now to FIG. 2, a system 200 in accordance with the principles disclosed herein is shown. Similar to the subsystem 110 discussed in reference to FIG. 1, the system 200 generally comprises a projector unit and a camera, which are placed in a housing unit as shown in FIG. 2. In this implementation, the housing unit is a light bulb that may be placed in a lighting fixture in a room. The projector unit and the camera are substantially hidden inside the housing unit when the subsystem 110 is viewed from a viewing surface. In other implementations, the housing unit may be any suitable structure for supporting the components while still complying with the principles disclosed herein. Moreover, in some implementations, the projector unit and the camera comprise a tilt mechanism (e.g., hinge) that includes an axis of rotation such that the projector unit and the camera may rotate up to 360 degrees. In one example, a user (not shown) may rotate the system 200 about the axis of rotation to attain an optimal viewing angle for the camera or an optimal projection angle for the projector unit. In another example, the user may control the rotation settings through a computing device (similar to the computing device 150 described in reference to FIG. 1) that is communicatively connected to the system 200.

The projection unit projects onto a touch sensitive mat 210. The surface of the mat 210 may comprise any suitable touch sensitive technology for detecting and tracking one or multiple touch inputs by a user in order to allow the user to interact with software being executed by the computing device (not shown) that the system 200 and the mat 210 are in communication with. For example, in some implementations, the surface may utilize known touch sensitive technologies such as, for example, resistive, capacitive, acoustic wave, infrared, strain gauge, optical, acoustic pulse recognition, or some combination thereof while still complying with the principles disclosed herein. In addition, in this example, the projection surface 220 extends over only a portion of the mat 210; however, it should be appreciated that in other examples, the surface may extend over substantially all of the mat 210 while still complying with the principles disclosed herein.

Any suitable wireless (or wired electrical coupling) connection may be used between the touch sensitive mat 210 and the computing device such as, for example, WI-FI, BLUETOOTH®, ultrasonic, electrical cables, electrical leads, electrical spring-loaded pogo pins with magnetic holding force, or some combination thereof, while still complying with the principles disclosed herein.

As described in more detail in reference to FIG. 1, the camera scans the surrounding of the system 200 and identifies the location of a suitable projection area for the system 200. In this example, the suitable projection area is the touch sensitive mat 210. Accordingly, the camera scans to locate the mat 210. In one implementation, once located, the camera may communicate the location of the mat 210 to the computing device, which then instructs the projector unit to project onto the mat 210. In another implementation, the camera may communicate the location of the mat 210 to the projector unit directly.

In one implementation, the camera may be a sensor bundle, which includes a plurality of sensors and/or cameras to measure and/or detect various parameters occurring on or near the mat 210 during operation. For example, the bundle includes an ambient light sensor, a camera (e.g., a color camera), a depth sensor or camera, and a three dimensional (3D) user interface sensor. Ambient light sensor is arranged to measure the intensity of light of the environment surrounding system 200, in order to, in some implementations, adjust the camera's and/or sensor's exposure settings, and/or adjust the intensity of the light emitted from other sources throughout system such as, for example, the projector unit. The camera may, in some instances, comprise a color camera which is arranged to take either a still image or a video of an object and/or document disposed on mat 210. Depth sensor generally indicates when a 3D object is on the surface. In particular, depth sensor may sense or detect the presence, shape, contours, motion, and/or the 3D depth of an object (or specific feature(s) of an object) placed on mat 210 during operation. Thus, in some implementations, sensor may employ any suitable sensor or camera arrangement to sense and detect a 3D object and/or the depth values of each pixel (whether infrared, color, or other) disposed in the sensor's field-of-view (FOV). For example, in some implementations sensor may comprise a single infrared (IR) camera sensor with a uniform flood of IR light, a dual IR camera sensor with a uniform flood of IR light, structured light depth sensor technology, time-of-flight (TOF) depth sensor technology, or some combination thereof. User interface sensor includes any suitable device or devices (e.g., sensor or camera) for tracking a user input device such as, for example, a hand, stylus, pointing device, etc. In some implementations, sensor includes a pair of cameras which are arranged to stereoscopically track the location of a user input device (e.g., a stylus) as it is moved by a user about the mat 210. In other examples, sensor may also or alternatively include an infrared camera(s) or sensor(s) that is arranged to detect infrared light that is either emitted or reflected by a user input device. It should further be appreciated that bundle may comprise other sensors and/or cameras either in lieu of or in addition to sensors previously described. In addition, as will explained in more detail below, each of the sensors within the bundle is communicatively coupled to the computing device such that data generated within the bundle may be transmitted to the computing device and commands issued by the computing device may be communicated to the sensors during operations. As is explained above, any suitable electrical and/or communicative coupling may be used to couple sensor bundle to the computing device such as for example, an electric conductor, WI-FI, BLUETOOTH®, an optical connection, an ultrasonic connection, or some combination thereof.

During operation of system 200, the computing device instructs the projection unit in the system 200 to project an image onto the projection surface 220 of the mat 210. More specifically, during operation of system 200, light is emitted from the projector unit towards the mat 210 thereby displaying an image on the projector display space 220. In this example, the display space 220 is substantially rectangular and is defined by a length L and a width W. In some examples length L may equal approximately 16 inches, while width W may equal approximately 12 inches; however, it should be appreciated that other values for both length L and width W may be used while still complying with the principles disclosed herein. In addition, the sensors within the bundle include a sensed space that, in at least some examples, overlaps and/or corresponds with the projector display space 220, previously described. The projector display space 220 defines the area that the sensors within the bundle are arranged to monitor and/or detect the conditions thereof in the manner previously described.

Further, in some examples, sensors disposed within the bundle may also generate system input which is routed to the computing device for further processing. For example, in some implementations, sensors within the bundle may sense the location and/or presence of a user's hand or stylus and then generate an input signal which is routed to a processor in the computing device. The processor then generates a corresponding output signal which is routed to the projector unit of the system 200 in the manner described above.

In addition, during operation of at least some examples, the camera of the system 100 may capture a two dimensional (2D) image or create a 3D scan of a physical object such that an image of the object may then be projected onto the surface 220 for further use and manipulation thereof. In particular, in some examples, an object may be placed on surface 220 such that sensors within the bundle may detect, for instance, the location, dimensions, and in some instances, the color of object, to enhance a 2D image or create a 3D scan thereof. The information gathered by the sensors within the bundle may then be routed to the processor in the computing unit. Thereafter, the processor directs projector unit to project an image of the object onto the surface 220. It should also be appreciated that in some examples, other objects such as documents or photos may also be scanned by sensors within the bundle in order to generate an image thereof which is projected onto surface 220 with the projection unit.

Figure 3:
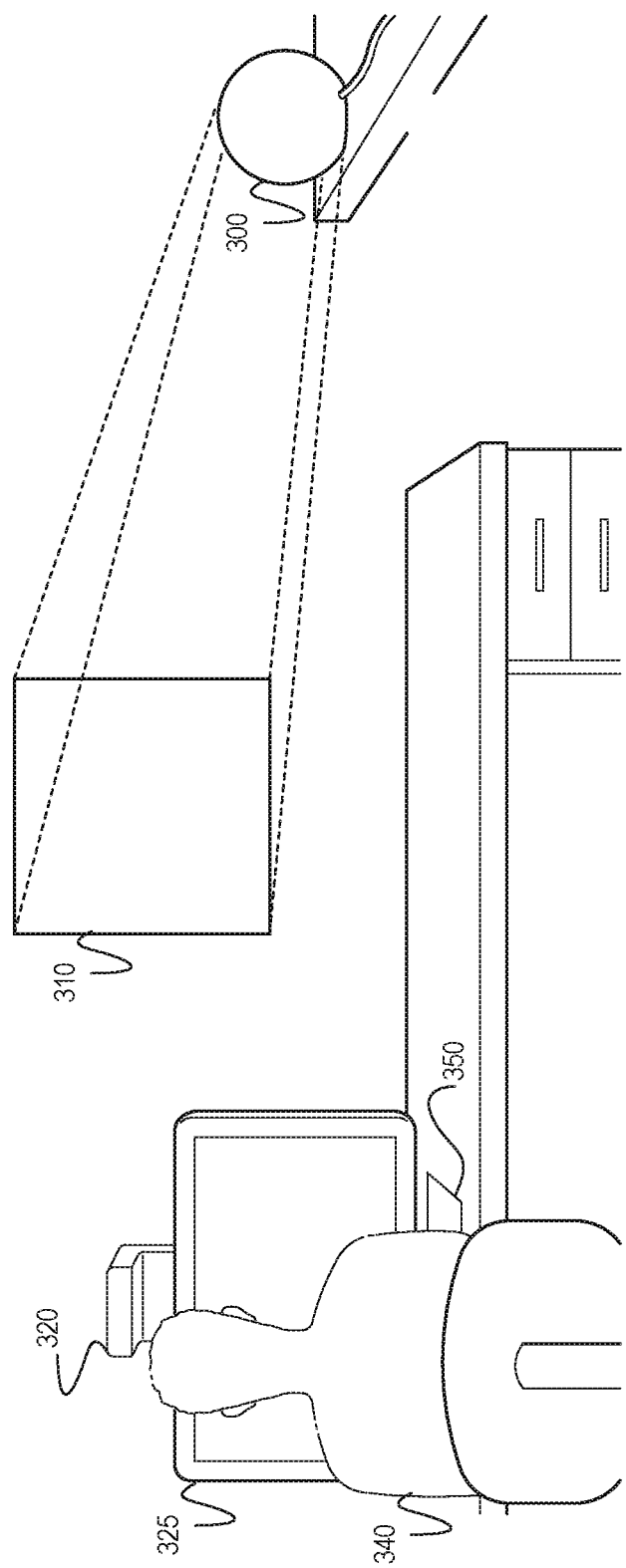
FIG. 3 is another schematic view of the system of FIG. 1 in accordance with the principles disclosed herein.

Referring now to FIG. 3, a system 300 in accordance with the principles disclosed herein is shown. The system 300 is communicatively connected to a computing device 320. In this example, the device 320 is an all-in-one computer. A display 325 of the device 320 defines a viewing surface and is disposed along the front side of the device to project images for viewing and interaction by a user 340. In some examples, the display 325 includes touch sensitive technology such as, for example, resistive, capacitive, acoustic wave, infrared (IR), strain gauge, optical, acoustic pulse recognition, or some combination thereof. Therefore, throughout the following description, the display 325 may periodically be referred to as a touch sensitive surface or display. In addition, in some examples, the device 320 further includes a camera that is to take images of the user 340 while he is positioned in front of display 325. In some implementations, the camera is a web camera. Further, in some examples, the device 325 also includes a microphone or similar device that is arranged to receive sound inputs (e.g., voice) from the user 340 during operation. Moreover, as described above in reference to FIG. 1, the system 300 may also include a microphone or similar device that is arranged to receive sound inputs (e.g., voice) from the user 340 during operation.

A touch sensitive mat 350 may be connected to the device 320. In one example, the connection may be physical. However, it should be appreciated that in other examples, the mat 350 may not be physically connected to the device 320, and suitable alignments methods or devices may be used while still complying with the principles disclosed herein. In one implementation, the touch sensitive mat 350 includes a central axis or centerline, a front side, and a rear side axially opposite the front side. In this example, a touch sensitive surface is disposed on mat 350 and is substantially aligned with the axis. Similar to the mat 210 shown in FIG. 2, the surface of the mat may comprise any suitable touch sensitive technology for detecting and tracking one or multiple touch inputs by a user in order to allow the user to interact with software being executed by the device 320 or some other computing device (not shown). For example, in some implementations, the surface may utilize known touch sensitive technologies such as, for example, resistive, capacitive, acoustic wave, infrared, strain gauge, optical, acoustic pulse recognition, or some combination thereof while still complying with the principles disclosed herein.

In addition, as will be described in more detail below, in at least some examples the surface of mat 350 and device 320 are electrically coupled to one another such that user inputs received by the surface are communicated to the device 320. As mentioned in reference to FIG. 2, any suitable wireless or wired electrical coupling or connection may be used between the surface and device such as, for example, WI-FI, BLUETOOTH®, ultrasonic, electrical cables, electrical leads, electrical spring-loaded pogo pins with magnetic holding force, or some combination thereof, while still complying with the principles disclosed herein. The wireless or wired connection transfer signals between the device 320 and the mat 350 during operation.

The system 300, similar to the systems 100 and/or 200 in FIGS. 1 and 2 respectively, includes a projection unit and a camera. The computing device 320 directs the projection unit in the system 300 to project an image onto a projection surface 310. In addition, the computing device 320 may also display an image on the display 325 (which may or may not be the same as the image projected onto the projection surface 310). The image projected may comprise information and/or images produced by software executing within the computing device 320. In one implementation, the user 340 may then interact with the image displayed on the projection surface 310 via gestures or voice commands. These commands may be detected by the camera or microphone in the system 300. In another implementation, the user 340 may interact with the image displayed on the projection surface 310 and the display 325 by physically engaging the touch sensitive surface 350. Such interaction may take place through any suitable method such as, direct interaction with a user's hand, through a stylus, or other suitable user input device(s). When the user 340 interacts with the projection surface 310, a signal is generated which is routed to the computing device 320 through any of the communication methods and devices previously described. Once the computing device 320 receives the signal generated, it is routed, through internal conductor paths, to a processor which communicates with a non-transitory computer-readable storage medium to generate an output signal which is then routed back to the projector unit in the system 300 to implement a change in the image projected onto the projection surface 310. It should also be appreciated that during this process, the user 340 may also be interacting with the image displayed on the display 325 through engagement with the touch sensitive surface 350 disposed thereon and/or through another user input device such as, for example, a keyboard and mouse.

In some examples, the system 300 may project a plurality of images onto a plurality of projection surfaces. Each image on each surface may be controlled by one or different users. These systems may communicate with one another either directly or via the computing units that they are communicatively connected to. More specifically, the system 300 may be used to create a shared digital workspace for remote collaboration between one or more users. Another system (with a projector unit and a camera) may be communicatively linked to the system 300 through any suitable connection such as, for example, an electric conductor, WI-FI, BLUETOOTH®, an optical connection, an ultrasonic connection, or some combination thereof, such that information and/or data may pass freely between the systems. During collaboration between users, images may be projected on projection surfaces associated with the systems to be scanned in the manner previously. For example, one user may interact with the projected image on the projection surface of a first system by pointing with a hand (or other object). The camera or sensors within the bundle may sense this interaction in the manner previously described and then capture an image or video of hand, which is then projected onto the surface of the second system such that the user of the second system may view the interaction between the hand of the user of the first system. During collaboration between the users, digital content that is generated by software executing on either computing device may be displayed on both the surfaces, via the projector units, such that both users may each view and interact with the shared digital content in a cooperative fashion.

While the computing device 150 has been described as an all-in-one computer, it should be appreciated that in other examples, device 150 may further employ the use of more traditional user input devices such as, for example, a keyboard and a mouse. In addition, while sensors within the bundle have been described as each representing a single sensor or camera, it should be appreciated that each of the sensors may each include multiple sensors or cameras while still complying with the principles described herein.

It should be noted that in other implementations, the system 300 may be utilized for home automation. More specifically, the system 300 and/or the computing device 320 may be communicatively coupled to various systems (e.g., thermostat, lighting, appliances, security alarm systems, and alike) in a home. The control panels (e.g., user interface) associated with these home systems may be displayed on the projection surface 310 via the projector unit in the system 300. The user 340 may interact with the displayed image by providing voice and/or gesture commands, which are captured by the camera and/or microphone and transmitted to the computing device 320. The computing device 320 then modifies the home system setting based on the input received from the user 340. For example, a control panel user interface associated with a home alarm system may be displayed on the projection surface 310. The user 340 may choose to turn the alarm system on and communicates this request via a gesture (e.g., hand clap) and/or voice command (e.g., "turn the house alarm on"). The camera and/or the microphone in the system 300 may capture the command from the user 340 and transmit the signal to the computing unit, which then proceeds to change the setting of the security system to ON. Other examples may be provided while still complying with the principles disclosed herein.

In some implementations, the system 300 may have a permanent location in an environment (e.g., a room in a house). In other examples, the system 300 may be portable. For example, the user 340 may choose to use the system 300 as a wearable accessory. More specifically, the user 340 may choose to carry the system 300 around in an environment (e.g., home). In such an implementation, the system 300 maintains connection with the computing unit 325. Although in this example, the computing unit shown to a stationary all-in-one computing device, in another implementation, the computing unit may be a portable device that moves with the user 340 (e.g., mobile device, tablet, smart watch and alike). In such an example, when the operation of the system 300 is initiated, the system 300 may confirm active connection with the computing device, scan the surrounding and identify a projection surface, and project the image from the computing device when provided.

Figure 4:
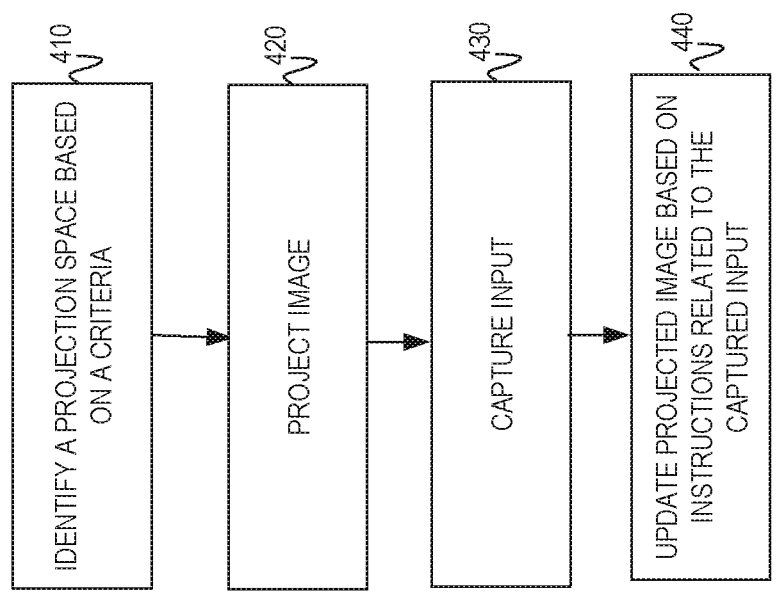
FIG. 4 is a flowchart of an example method executable by a system of FIG. 1 in accordance with the principles disclosed herein.

Referring now to FIG. 4, a flowchart of an example method executable by a system similar to the systems 100-300 described in reference to FIGS. 1-3 is shown in accordance with the principles disclosed herein. At block 410, the system identifies a projection space via a camera based on at least one criteria. At block 420, a projector unit in the system projects an image received from a computing device that the system is connected to. At block 430, the system captures input related to the projected image. In one implementation, such input may be from a user, and may be captured via a microphone or a camera, and may be communicated to the computing device. The computing device may update the image based on the input, and transmits it back to the system to be projected on the projection space. At block 440, the system projects the updated image.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
a camera to scan a plurality of projection areas;
a processor to:
    in response to detecting an obstacle or a shadow in a first projection area of the plurality of projection areas, decline to select the first projection area based on a criterion that relates to presence of an obstacle or a shadow,
    control the camera to continue scanning for another projection area in response to declining to select the first projection area, select a second projection area of the plurality of projection areas based on the criterion, wherein the second projection area is free from an obstacle and a shadow, present, to a user, an indication of the selection of the second projection area based on the criterion, receive, from the user responsive to the presented indication, a rejection of the second projection area, and in response to the rejection, select a third projection area of the plurality of projection areas based on the criterion, wherein the third projection area is free from an obstacle and a shadow; and a projector to project an image to the third projection area based on the selection of the third projection area by the processor, wherein the projector is to receive the image from a computing unit and instructions to project the image onto the third projection area, and wherein the camera is to capture an input and provide the input to the computing unit that causes the computing unit to update the image based on the input.

2. The system of claim 1, wherein the camera and the projector are located in a housing.

3. The system of claim 2, wherein the housing comprises a lighting fixture.

4. The system of claim 1, wherein the camera is to rotate up to 360 degrees to identify the plurality of projection areas, and the projector is to rotate up to 360 degrees to project the image.

5. The system of claim 1, further comprising a touch sensitive mat, wherein when the third projection area falls on the touch sensitive mat, the projector is to project the image onto the touch sensitive mat.

6. The system of claim 5, wherein the touch sensitive mat is communicatively coupled to the computing unit, and the input is responsive to a user interacting with the touch sensitive mat.

7. The system of claim 1, further comprising a microphone to receive the input from a user, wherein the input comprises a voice command.

8. The system of claim 7, wherein the processor is to request a confirmation from the user regarding acceptance of the second third projection area.

9. The system of claim 1, wherein the image projected on the third projection area is manipulated based on the input from a user.

10. The system of claim 1, wherein, during a remote collaboration with a further system, the computing unit is to cause the projector to project the image onto the third projection area, the projected image including an image of physical content received from the further system as well as digital content, the computing unit including a display on which a video image from the further system is to be displayed.

11. The system of claim 1, wherein:
the projector is to project a home automation interface onto the third projection area to allow the user to interact with a home automation system, and
the camera is to capture commands from the user to be implemented on the home automation system.

12. A system, comprising:
a camera to scan a plurality of projection surfaces;
a computer to:
in response to detecting an obstacle or a shadow in a first projection surface of the plurality of projection surfaces, decline to select the first projection surface based on a criterion that relates to presence of an obstacle or a shadow,
control the camera to continue scanning for another projection surface in response to declining to select the first projection surface,
select a second projection surface of the plurality of projection surfaces based on the criterion, wherein the second projection surface is free from an obstacle and a shadow,
present, to a user, an indication of the selection of the second projection surface based on the criterion,
receive, from the user responsive to the presented indication, a rejection of the second projection surface, and
in response to the rejection, select a third projection surface of the plurality of projection surfaces based on the criterion, wherein the third projection surface is free from an obstacle and a shadow; and
a projector to project an image onto the third projection surface, wherein the computer is to cause the camera to scan a physical object placed on the third projection surface to produce a scanned image, and to cause the projector to project the scanned image onto the third projection surface.

13. The system of claim 12, further comprising a plurality of cameras, at least one camera of the plurality of cameras being used for depth detection, and at least two cameras of the plurality of cameras being used for stereoscopic stylus tracking.

14. A method, comprising:
scanning, by a camera, a plurality of projection areas;
in response to detecting an obstacle or a shadow in a first projection area of the plurality of projection areas, declining, by a processor, to select the first projection area based on a criterion that relates to presence of an obstacle or a shadow;
controlling, by the processor, the camera to continue scanning for another projection area in response to declining to select the first projection area;
selecting, by the processor, a second projection area of the plurality of projection areas based on the criterion, wherein the second projection area is free from an obstacle and a shadow;
presenting, by the processor to a user, an indication of the selection of the second projection area based on the criterion;
receiving, by the processor from the user responsive to the presented indication, a rejection of the second projection area;
in response to the rejection, selecting, by the processor, a third projection area of the plurality of projection areas based on the criterion, wherein the third projection area is free from an obstacle and a shadow;
projecting, by a projector, an image onto the third projection area;
capturing input related to the projected image; and
updating the projected image based on the captured input.

15. The method of claim 14, further comprising performing alignment and calibration to refine the third projection area.

16. The system of claim 1, wherein the camera is to capture an image of a physical object on the third projection area, and provide the image of the physical object to the computing unit, and wherein the computing unit is to cause projection by the projector of the image of the physical object on the third projection area.

17. The system of claim 16, wherein the camera is to capture a further image of user interaction with the image of the physical object on the third projection area, and provide the further image to the computing unit, and wherein the computing unit is to, in response to the further image, cause the projector to change a displayed image on the third projection area.

18. The system of claim 12, wherein the camera is to capture a further image of user interaction with the scanned image of the physical object on the third projection surface, and provide the further image to the computer, and wherein the computer is to, in response to the further image, cause the projector to change a displayed image on the third projection surface.

19. The method of claim 14, further comprising:
   capturing, by the camera, an image of a physical object on the third projection area;
   providing, by the camera, the image of the physical object to the processor;
   causing, by the processor, the projector to project the image of the physical object on the third projection area.

20. The method of claim 19, further comprising:
   capturing, by the camera, a further image of user interaction with the projected image of the physical object on the third projection area;
   providing, by the camera, the further image to the processor; and
   in response to the further image, causing, by the processor, the projector to change a displayed image on the third projection area.

\* \* \* \* \*